Nov. 7, 1961    J. PERRET ET AL    3,007,777
METHODS OF ISOTOPE CONCENTRATION
Filed Jan. 3, 1958    3 Sheets-Sheet 1

3,007,777
METHODS OF ISOTOPE CONCENTRATION
Jean Perret and Pierre Wuithier, Paris, and Etienne Roth, Fontenay-aux-Roses, France, assignors to Commissariat a l'Energie Atomique, Paris, France
Filed Jan. 3, 1958, Ser. No. 707,051
Claims priority, application France Jan. 12, 1957
3 Claims. (Cl. 23—204)

The present invention relates to methods of isotope concentration.

In order to enrich a substance in one isotope of an element included in said substance, it is known to establish, in a system including at least one stage comprising two exchange apparatus at different respective temperatures, an intimate contact, possibly in the presence of a catalyst, between said substance and an auxiliary material in a phase different from that of said substance, said auxiliary material also containing said element.

The object of our invention is to provide a method of this kind in which the total amount of auxiliary material necessary for carrying out the process is reduced, together with the consumption of energy for circulating this material and for heating and cooling it at intermediate points of its path of travel.

According to our invention, in an apparatus as above described, including a plurality of such stages, we circulate said auxiliary material between at least some of said stages to cause the amount of said auxiliary material leaving the exchange apparatus of a stage numbered $n$ where it is exhausted in said isotope to be recycled to the inlet of the corresponding exchange apparatus of a stage numbered $n-p$ ($p$ being an integer smaller than $n$) while causing a portion of said auxiliary material leaving the exchange apparatus of stage $n-p$ where it is enriched in said isotope to be recycled to the inlet of the corresponding exchange apparatus of stage $n$.

Figure 1:
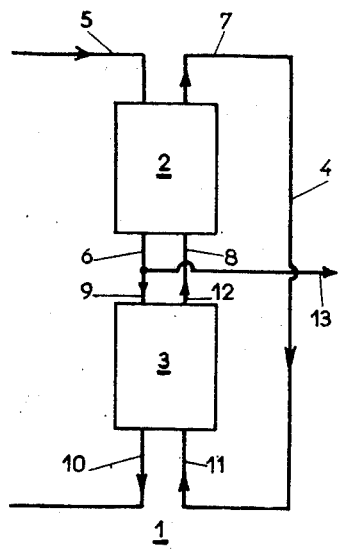

FIG. 1 diagrammatically illustrates a known method of concentrating an isotope as above referred to.

On said FIGURE 1 we have shown a single stage 1 including two exchange apparatus of a conventional type, one of them, 2, working at low temperature and being called "cold exchange apparatus," and the other, 3, working at high temperature and being called "hot exchange apparatus."

If a chemical element A is constituted by two isotopes $a$ and $a'$ and if it is desired to enrich in one of these isotopes, for instance $a'$, a substance constituted by a compound AB including element A, the method consists in establishing an intimate contact of said compound AB with another material, for instance a compound AC, which also includes element A. This produces an isotopic exchange reaction as follows:

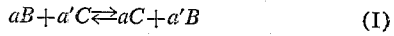

$$aB + a'C \rightleftharpoons aC + a'B \quad (I)$$

and the equilibrium of exchange may be expressed by:

$$K = \frac{(a'B)(aC)}{(aB)(a'C)}$$

K being different for different temperatures of reaction.

If for instance coefficient K increases when the temperature is lowered, the device of FIG. 1 may be used in the following manner.

It is supposed that compound AC is gaseous and circulates through the closed circuit 4 and that compound AB is liquid.

Compound AB is introduced at the inlet 5 of the cold exchange apparatus 2. It flows therethrough in counter-current contact with compound AC and the conditions of concentration of the fluids and the temperature are such that in Reaction I the equilibrium is shifted as indicated by the top arrow. At the outlet 6 of exchange apparatus 2, compound AB is richer in compound $a'B$, therefore in isotope $a'$, than it was at the inlet 5, and, correspondingly, compound AC contains a smaller amount of isotope $a'$ at the outlet 7 of exchange apparatus 2 than at the inlet 8 of this apparatus.

In the hot exchange apparatus 3, the conditions of concentration of the fluids and the temperature are such that in Reaction I the equilibrium is shifted as indicated by the bottom arrow. Consequently, when flowing through exchange apparatus 3 from its inlet 9 to its outlet 10, compound AB becomes poorer in isotope $a'$ and, correspondingly, compound AC becomes richer in isotope $a'$ when flowing from 11 to 12 through exchange apparatus 3. It follows that the concentrations in isotope $a'$ of each of the two compounds AB and AC are maximum between the two exchange apparatus 2 and 3. Accordingly, we collect at 13 a portion of compound AB, richer in isotope $a'$ than at the inlet 5 of exchange apparatus 2.

It will be seen that, due to the difference of temperature existing between exchange apparatus 2 and exchange apparatus 3, the auxiliary fluid AC, which flows through a closed circuit in conduit 4, is enriched in isotope $a'$ in apparatus 3 and gives off this excess of isotope $a'$ to compound AB in exchange apparatus 2.

In the known systems based on this principle, there are several stages such as that shown at 1 on FIG. 1. The amount of fluid collected at 13 is fed to a second stage identical to stage 1 and the fact of providing a plurality of such stages permits of obtaining the desired final concentration of isotope $a'$ in compound AB.

Such a known system has already been used, for instance for enriching water in deuterium, by isotopic exchange with hydrogen sulphide acting as auxiliary fluid.

In this case we establish an intimate contact, at suitable temperatures and pressures, between a liquid phase constituted by water with or without hydrogen sulphide dissolved therein and a gaseous phase constituted by hydrogen sulphide either saturated or not with water vapor; this intimate contact produces an isotopic exchange reaction of the type:

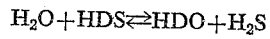

$$H_2O + HDS \rightleftharpoons HDO + H_2S$$

The fact that the two exchange apparatus work at different respective temperatures produces, for each of them, a different distribution of deuterium between the two phases.

The concentration of deuterium in water thus placed in contact with hydrogen sulphide at a given temperature is the higher as the temperature is lower. Counter-current contact of the two phases at two suitably chosen temperatures causes an enrichment in deuterium of the liquid phase in the exchange apparatus working at low temperature and an enrichment in deuterium of the gaseous phase in the exchange apparatus working at high temperature. Therefore the concentration of deuterium in water is maximum as said water flows out from the cold exchange apparatus and the concentration of deuterium in hydrogen sulphide is maximum as said hydrogen sulphide flows out from the hot exchange apparatus.

For practical purposes, some amount of water enriched in deuterium is extracted as said water flows out from the sold exchange apparatus and it is again enriched in deuterium by treating it in a second stage working on the same principle as the first one.

The use of a series of such stages permits of reaching the desired final concentration of heavy water in ordinary water.

Such systems therefore include, at every stage, an independent circulation of auxiliary fluid in a closed circuit. It is therefore necessary to provide as many independent closed circuits (with their equipment such as compressors, and so on) as there are stages in the system.

In order to reduce the total amount of auxiliary fluid that is necessary, and also the expenses of equipment and power necessary for working such a system, we make use, according to the present invention, of a circulation of auxiliary fluid through several different stages. For this purpose:

The total amount of this fluid flowing out from the cold exchange apparatus of at least one stage $n$ is recycled to the inlet of the cold exchange apparatus of stage $n-p$ ($p$ being an integer smaller than $n$); and A suitable amount of this fluid leaving the hot exchange apparatus of stage $n-p$ is collected and sent to the inlet of the hot exchange apparatus of stage $n$.

Said amount of fluid is determined as follows:

We will hereinafter designate by—

$A_n$ the flow rate of fluid to be enriched fed to stage $n$ (which fluid will be called "main" fluid);

$G_n$ the flow rate of auxiliary fluid flowing through each exchange apparatus of stage $n$;

$Y_n$ the molecular concentration of isotope in the main flued fed to stage $n$;

$\beta$ the ratio $Y_{n+1}/Y_n$, higher than 1, supposed to be the same for all the stages (it is the isotopic enrichment coefficient of the main fluid per stage, that is to say in every cold exchange apparatus);

$X_n$ the molecular concentration of isotope in the residue of the main fluid flowing out from the hot exchange apparatus of stage $n$;

$\alpha$ the ratio $X_n/Y_n$, smaller than 1, supposed to be the same for all the stages (it is the loss coefficient of the main fluid between its inflow to, and its outflow from, a stage).

In order to calculate an isotopic enrichment system, we first fix the ratio $\beta$ and the number of stages, account being taken of the desired final enrichment.

In these conditions, and for a given value of coefficient $\alpha$, calculation shows that the flow rates of main fluid are given for every stage and that, in first approximation:

$$A_{n+1} = \frac{A_n}{\beta} \qquad (II)$$

Furthermore it is known that, for a given temperature of the cold exchange apparatus, the maximum efficiency of enrichment is obtained for a well determined value of the ratio $G_n/A_n$ which does not depend upon the isotope concentrations; said low temperature being the same for all the stages, this ratio is the same for every stage and $$\frac{G_n}{A_n} = \frac{G_{n+1}}{A_{n+1}} \qquad (III)$$

Comparison between (II) and (III) gives:

$$G_{n+1} = \frac{1}{\beta} G_n$$

or, in a more general manner:

$$G_n = \frac{1}{\beta^p} G_{n-p}$$

In other words, the proportion of auxiliary fluid to be collected from the total amount of this fluid flowing out from the hot exchange apparatus of stage $n-p$, to send it to the inlet of the hot exchange apparatus of stage $n$, is equal to the inverse of the $p$ power of the isotopic enrichment coefficient of the main fluid per stage.

Figure 2:
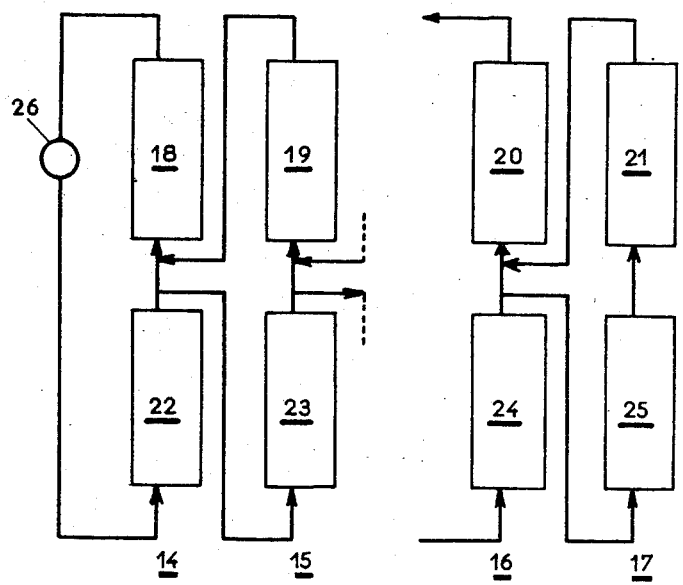

Preferred embodiments of the present invention will be hereinafter described with reference to the accompanying drawings, given merely by way of example and in which:

FIG. 2 diagrammatically illustrates the circulation of the auxiliary fluid in a system made according to the invention and where $p$ is equal to 1.

Figure 3:
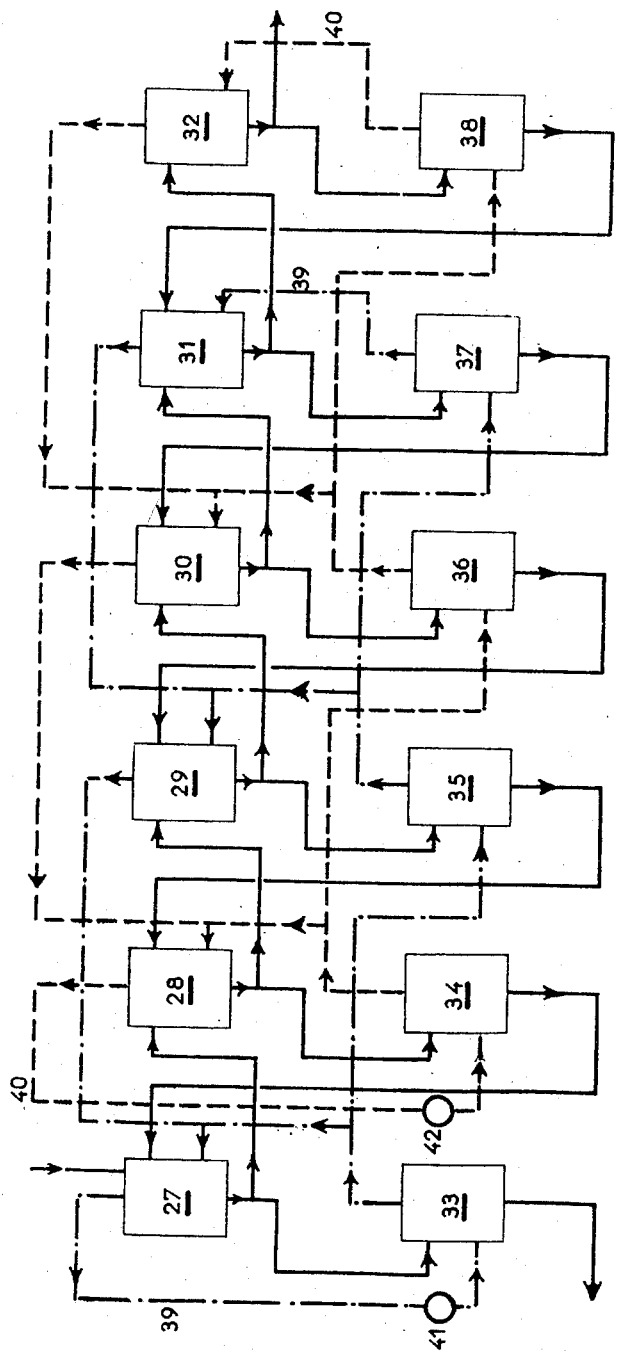

FIG. 3 diagrammatically shows another embodiment of the invention with two independent circulations of auxiliary fluid, $p$ being equal to 2.

Figure 4:
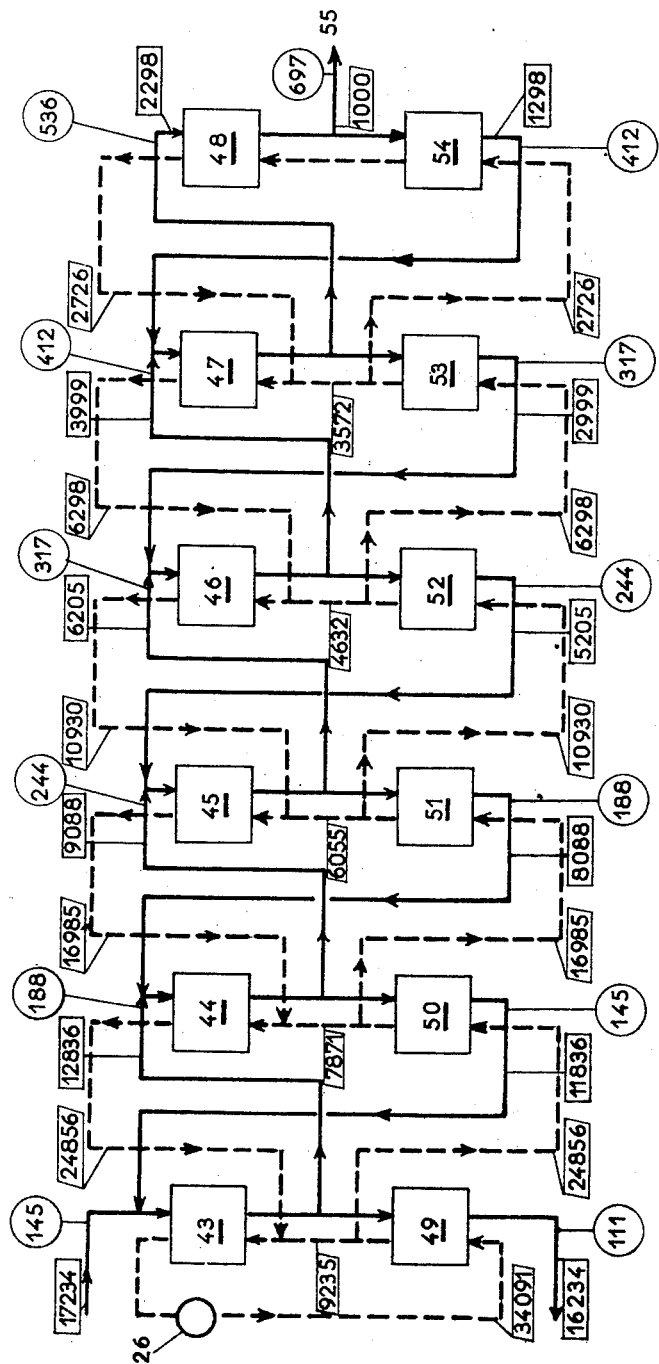

FIG. 4 diagrammatically shows a complete system including the elements of FIG. 2.

On FIG. 2 we have shown only the two first stages 14 and 15 and the two last stages 16 and 17 of a system of exchange apparatus according to the invention. The cold exchange apparatus are shown at 18, 19, 20 and 21 and the hot exchange apparatus at 22, 23, 24 and 25. These apparatus may, when the reaction is too slow, contain one or several successive beds of catalysts.

In the system illustrated by FIG. 2, there is only one independent circulation of auxiliary fluid ($p=1$), said fluid being driven by a pump or compressor 26.

If we designate by G the amount of auxiliary fluid circulated by pump 26 and fed to the inlet of apparatus 22, we collect through any suitable means a portion $G/\beta$ of this fluid at the outlet of exchange apparatus 22 and this portion of said fluid is fed to exchange apparatus 23 whereas the remainder, that is to say $$G\left(1 - \frac{1}{\beta}\right)$$

is fed to exchange apparatus 18. This apparatus 18 also receives an amount of auxiliary fluid $G/\beta$ from exchange apparatus 19, so that the total flow rate of this fluid flowing out from apparatus 18 is again G.

In a likewise manner, at the outlet of exchange apparatus 23, the portion $G/\beta^2$ of the total auxiliary fluid is sent toward the next exchange apparatus (not shown) and the portion $$\frac{G}{\beta}\left(1 - \frac{1}{\beta}\right)$$

is fed toward exchange apparatus 19 which also receives $G/\beta^2$ from the next cold exchange apparatus (also not shown).

In the last stage 17, the whole of the auxiliary fluid flowing out from exchange apparatus 25 is recycled to exchange apparatus 21.

The total amount of auxiliary fluid to be circulated for the whole of the system is therefore equal to G, whereas it would be equal to:

$$G_1 + G_2 + \ldots + G_n = G\sum_{n=1}^{n=N} \frac{1}{\beta^{n-1}}$$

$$= G\frac{1 - \frac{1}{\beta^N}}{1 - \frac{1}{\beta}} \text{ (N being the number of stages)}$$

in the case of independent circulations for several stages as in conventional apparatus. In first approximation, the amount of auxiliary fluid to be circulated is therefore divided, according to the invention, by the factor:

$$\frac{1 - \frac{1}{\beta^N}}{1 - \frac{1}{\beta}}$$

The amount of energy necessary for the successive coolings and heatings of this auxiliary fluid is consequently also divided by an analogous factor.

For instance, in the case of an enrichment coefficient $\beta$ per stage equal to 3, which requires six stages ($N=6$) in order to bring to 10% the concentration of deuterium in a natural water containing 144 parts per million of deuterium, the total amount of hydrogen sulphide necessary for the whole of the system will be 1.5 times smaller if the circulation takes place according to the arrangement illustrated by FIG. 2 than in the case of an independent circulation for every stage.

FIG. 3 shows a modification of the system according to our invention, in which $p$ is equal to 2. It therefore includes two independent circulations of auxiliary fluid, one between the even numbered stages and the other between the odd numbered stages. The circulation of the fluid to be enriched is of a known type.

On said FIG. 3, the cold exchange apparatus are shown at 27, 28, 29, 30, 31 and 32 and the hot exchange apparatus at 33, 34, 35, 36, 37 and 38. According to the invention, these two circuits 39 (in dot-and-dash lines) and 40 (in dotted lines) for the auxiliary fluid are wholly independent of each other and the circulation of this fluid is obtained by means of pumps or compressors 41 and 42, respectively.

This modification may be of interest if the isotopic concentration of the main fluid (which may be partly driven by the auxiliary fluid) is substantially the same at the top of the hot exchange apparatus of stage $n$ and at the bottom of the hot exchange apparatus of stage $n+2$.

Of course we might, within the scope of the present invention, combine several circulation lay-outs of the kind above described, in a single system, for instance by dividing this system into several groups of successive stages disposed in series and by providing each of these groups with a circulation of the type in which $p$ is equal to 1.

FIG. 4 diagrammatically shows a system according to the invention for the production of heavy water by isotopic exchange between water (main fluid) and hydrogen sulphide (auxiliary fluid).

On said FIG. 4, the cold exchange apparatus are shown at 43, 44, 45, 46, 47 and 48 and the hot exchange apparatus at 49, 50, 51, 52, 53 and 54. Water circulation takes place according to a known arrangement (solid lines circuit) and there is only one circulation of hydrogen sulphide gas, taking place from one stage to the next stage ($p=1$); compressor 26 circulates this hydrogen sulphide in the whole system (dotted lines circuits).

The magnitudes characterizing the operation of this system are as follows:

$$\beta = 1.3$$
$$\alpha = 0.769$$
$$\frac{G}{A} = 2.10$$

The low temperature, that is to say the temperature of the cold exchange apparatus, is 30° C. (this temperature has been chosen because it is the lowest that can be obtained in all seasons without making use of a refrigerating plant);

High temperature: 160° C.;
Pressure: 20 atmospheres.

The flow rates of water to be enriched are indicated for every stage in thousand molecules per hour (numbers inscribed inside rectangles).

The flow rates of hydrogen sulphide are also mentioned for every stage in thousand molecules per hour (numbers written inside parallelograms).

The concentrations of deuterium in water are indicated for every stage in parts per million (numbers surrounded by a circle).

For a flow rate of water equal to, or higher than, $17,234 \cdot 10^3$ molecules per hour of natural water containing 145 parts per million of deuterium at the inlet, the system of FIG. 4 produces, at the outlet 55, 1,000,000 molecules per hour of water enriched to 697 parts per million of deuterium. The total flow rate of hydrogen sulphide is $34,091 \cdot 10^3$ molecules per hour whereas, in the case of an independent circulation in every stage of a conventional type, it would be necessary to use $95,886 \cdot 10^3$ molecules per hour.

What we claim is:

1. In a method of preparing a fluid substance enriched in deuterium by exchange of deuterium between a principal fluid hydrogen-containing substance to be enriched and an auxiliary hydrogen-containing substance in the gaseous phase, both substance containing deuterium, in a cascade system of interconnected stages, wherein each stage comprises two exchange columns maintained at different temperatures through each of which columns said two substances flow in countercurrent and intermingle so that said principal substance is enriched in one column and impoverished in the other, wherein a proportion of the principal substance flowing through each stage except the last is withdrawn between the exchange columns and passed to the enriching column of the next succeeding stage, the principal substance flowing from the impoverishing column of each stage except the first being returned to the enriching column of the next preceding stage, the principal substance being fed into and withdrawn from the first stage and the principal substance enriched in deuterium being withdrawn as product between the columns of the last stage, the improvement which consists in withdrawing auxiliary substance impoverished in deuterium from the enriching column of a stage numbered $n$, returning said auxiliary substance to the enriching column of a stage numbered $n-p$ ($p$ being an integer smaller than $n$ and greater than 1), while withdrawing auxiliary substance enriched in deuterium from stage $n-p$ and returning it to the impoverishing column of stage $n$.

2. A method according to claim 1 in which the isotopic enrichment coefficient of the substance to be enriched has substantially the same value in each of said stages and the portion of the auxiliary substance flowing out from the exchange apparatus of stage $n-p$ that is collected to be sent to the corresponding exchange apparatus of stage $n$ has a value substantially equal to the inverse of the $p$ power of said coefficient.

3. A method according to claim 1 in which the substance to be enriched in deuterium is water, and the auxiliary substance is hydrogen sulphide.

References Cited in the file of this patent

UNITED STATES PATENTS

| | | |
|---|---|---|
| 2,787,526 | Spevack | Apr. 2, 1957 |
| 2,895,803 | Spevack | July 21, 1959 |

FOREIGN PATENTS

| | | |
|---|---|---|
| 1,138,776 | France | Feb. 4, 1957 |